(12) United States Patent
Kim

(10) Patent No.: US 10,060,410 B2
(45) Date of Patent: Aug. 28, 2018

(54) GRAVITY POWER AND DESALINATION TECHNOLOGY SYSTEM

(71) Applicant: Dongho Kim, Los Angeles, CA (US)

(72) Inventor: Dongho Kim, Los Angeles, CA (US)

( * ) Notice: Subject to any disclaimer, the term of this patent is extended or adjusted under 35 U.S.C. 154(b) by 37 days.

(21) Appl. No.: 15/241,465

(22) Filed: Aug. 19, 2016

(65) Prior Publication Data

US 2017/0051717 A1    Feb. 23, 2017

Related U.S. Application Data

(60) Provisional application No. 62/208,543, filed on Aug. 21, 2015.

(51) Int. Cl.
| | | |
|---|---|---|
| *F03B 17/06* | (2006.01) |
| *H02K 7/18* | (2006.01) |
| *B01D 1/00* | (2006.01) |
| *B01D 5/00* | (2006.01) |
| *B01D 1/10* | (2006.01) |

(Continued)

(52) U.S. Cl.
CPC .......... *F03B 17/061* (2013.01); *B01D 1/0011* (2013.01); *B01D 1/0064* (2013.01); *B01D 1/10* (2013.01); *B01D 3/346* (2013.01); *B01D 5/006* (2013.01); *B01D 5/0012* (2013.01); *B01D 5/0033* (2013.01); *B01D 5/0039* (2013.01); *B01D 5/0081* (2013.01); *C02F 1/14* (2013.01); *H02K 7/1823* (2013.01); *C02F 1/047* (2013.01); *C02F 2103/08* (2013.01); *F03D 9/35* (2016.05); *F05B 2220/32* (2013.01); *F05B 2220/706* (2013.01); *Y02A 20/128* (2018.01); *Y02A 20/129* (2018.01); *Y02A 20/141* (2018.01); *Y02A 20/142* (2018.01); *Y02A 20/212* (2018.01);
(Continued)

(58) Field of Classification Search
CPC . F03B 17/061; F03D 9/25; C02F 1/14; Y02E 10/465; F05B 2240/031; F05B 2260/24
See application file for complete search history.

(56) References Cited

U.S. PATENT DOCUMENTS 4,452,046 A * 6/1984 Valentin .................... F03D 1/04
290/55
4,519,960 A * 5/1985 Kitterman ................ B01J 19/30
202/158

(Continued)

*Primary Examiner* — Sean Gugger
(74) *Attorney, Agent, or Firm* — John K. Park; Park Law Firm

(57) ABSTRACT

A gravity power and desalination technology system is provided, including a heat storage apparatus, an inner tube portion, a hot-air and vapor generator, and venting holes, a corrugated tube portion, an outer tube portion, an updraft wind power generator, and an artificial hydro power generator. The heat storage apparatus is provided in a lower portion and configured. The inner tube portion has an inner vent portion inside and disposed vertically over the heat storage apparatus. The hot-air and vapor generator is disposed between the heat storage apparatus and the inner tube portion. The venting holes are bored through the inner tube portion obliquely outwards. The corrugated tube portion is provided on a top portion of the outer tube portion. The updraft wind power generator and the artificial hydro power generator are installed in the lower portions of the inner vent portion and the outer vent portion, respectively.

16 Claims, 11 Drawing Sheets

(51) Int. Cl.
  *C02F 1/14* (2006.01)
  *B01D 3/34* (2006.01)
  *C02F 1/04* (2006.01)
  *C02F 103/08* (2006.01)
  *F03D 9/35* (2016.01)

(52) U.S. Cl.
  CPC ............ *Y02E 10/28* (2013.01); *Y02E 10/465* (2013.01); *Y02P 70/34* (2015.11)

(56) References Cited

U.S. PATENT DOCUMENTS

| | | | | |
|---|---|---|---|---|
| 6,590,300 | B1 * | 7/2003 | Preito Santiago | F03D 1/04 290/44 |
| 6,626,636 | B2 * | 9/2003 | Bohn | F03D 1/04 290/55 |
| 7,779,635 | B2 * | 8/2010 | Lin | F03G 6/045 60/641.11 |
| 2002/0036407 | A1 * | 3/2002 | Ferraro | F03D 1/04 290/5 |
| 2007/0245730 | A1 * | 10/2007 | Mok | F03D 1/04 60/641.8 |
| 2009/0241545 | A1 * | 10/2009 | McCutchen | F01K 9/00 60/670 |
| 2010/0219637 | A1 * | 9/2010 | Hovakimian | F03D 9/00 290/52 |
| 2011/0278928 | A1 * | 11/2011 | Burger | F03D 1/04 307/39 |
| 2012/0085093 | A1 * | 4/2012 | Kim | F24F 5/0046 60/641.8 |
| 2012/0138447 | A1 * | 6/2012 | Glynn | B01D 1/0035 202/189 |

* cited by examiner

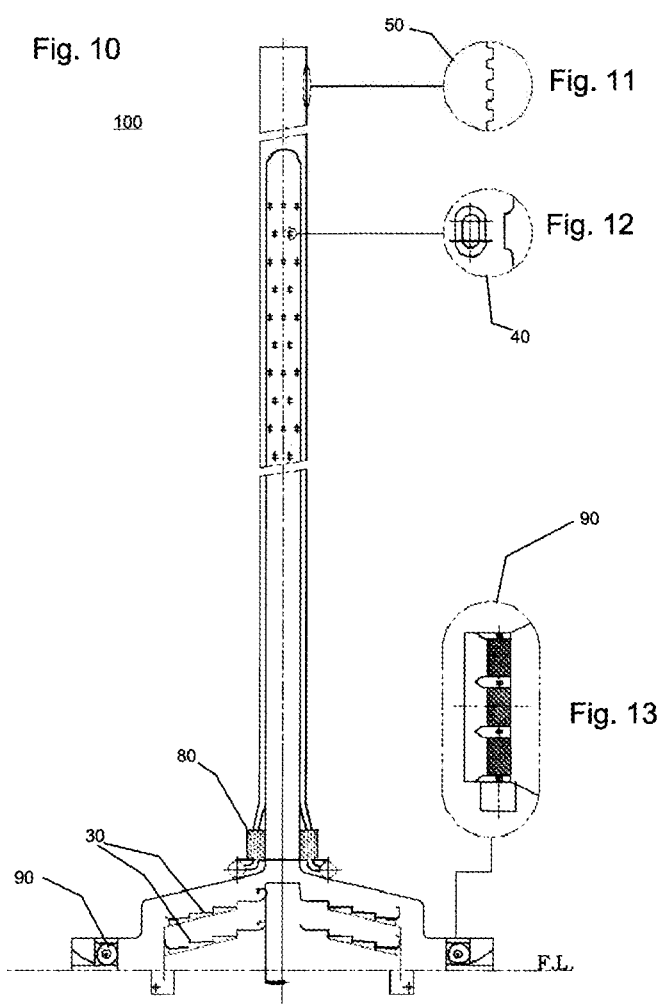

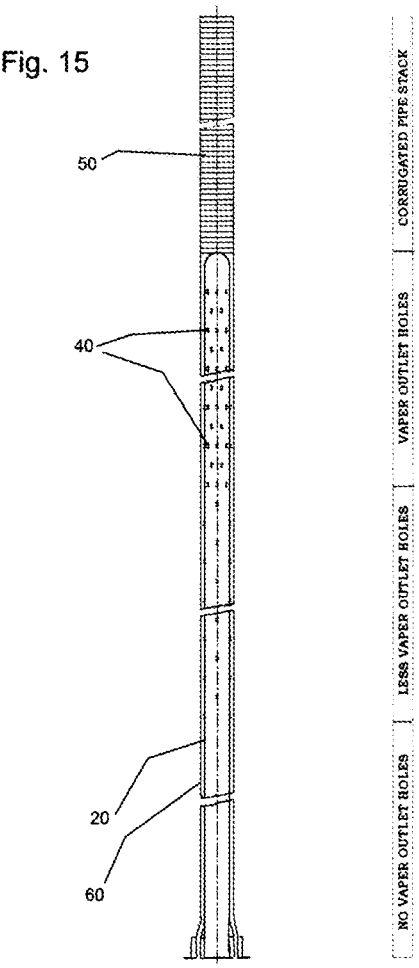

GRAVITY POWER AND DESALINATION TECHNOLOGY SYSTEM

RELATED APPLICATION

This application is a Non-provisional application of U.S. Provisional Patent Application No. 62/208,543 for "Gravity Power & Desalination Technology System" filed on Aug. 21, 2015.

BACKGROUND OF THE INVENTION

The present invention relates to a gravity power and desalination technology system.

The ENERGY SOURCE is GRAVITY with ATMOSPHERIC PRESSURE and HYDRO POWER. The medium for generating energy is water (H2O) and air (CO2). Technology for using the re-cycling activities of water and air that has repeated circulating activities of evaporation and condensation, expansion and contraction, rising and dropping, and rotation and movement as energy through gravity and atmospheric pressure.

Accordingly, a need for a gravity power and desalination technology system has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a gravity power and desalination technology system.

As aspect of the invention provides a gravity power and desalination, comprising a heat storage apparatus, an inner tube portion, a hot-air and vapor generator, and a plurality of venting holes, a corrugated tube portion, an updraft wind power generator, and an artificial hydro power generator.

The heat storage apparatus is provided in a lower portion of the gravity power and desalination technology system and configured for storing heat received from an external hybrid renewable energy system.

The inner tube portion has an inner vent portion inside and disposed vertically over the heat storage apparatus.

The hot-air and vapor generator is disposed between the heat storage apparatus and the inner tube portion and configured for using the heat stored in the heat storage apparatus and generating hot-air and vapor, and providing the generated hot-air and vapor to the inner vent portion.

The outer tube portion encloses the inner tube portion and forming an outer vent portion in between the inner tube portion and the outer tube portion.

The plurality of venting holes are bored through the inner tube portion obliquely outwards.

The corrugated tube portion is provided on a top portion of the outer tube portion.

The updraft wind power generator is installed in a lower portion of the inner vent portion.

The artificial hydro power generator is installed in a lower portion of the outer vent portion.

The heat storage apparatus may be provided under the ground and has a circular shape with the inner tube portion and the outer tube portion disposed at a center of the circular shape.

The gravity power and desalination technology system may further comprise a collection funnel portion provided between the hot-air and vapor generator and the inner and outer tube portions and configured for collecting and guiding the generated hot-air and vapor to the inner vent portion.

The gravity power and desalination technology system may further comprise a plurality of condensate water collectors disposed on an upper surface of the funnel portion and configured for collecting and guiding condensate water from the artificial hydro power generator to the hot-air and vapor generator.

Each of the plurality of condensate water collectors comprises a plurality of step portions cascading from a central portion of the upper surface of the funnel portion down to a perimeter portion of the funnel portion, and wherein each of the plurality of step portions is heated by solar energy coming through a canopy portion provided over the funnel portion.

The gravity power and desalination technology system may further comprise a sea water supplier and a desalination water collector.

The sea water supplier is connected to the hot-air and vapor generator for providing sea water to the hot-air and vapor generator.

The desalination water collector is connected to the plurality of condensate water collectors and configured for extracting the desalination water to an outside.

The gravity power and desalination technology system may further comprise a brine water extractor connected to the hot-air and vapor generator for collecting and extracting brine water to outside.

The gravity power and desalination technology system may further comprise a water intake connected to the hot-air and vapor generator and an air intake connected to the hot-air and vapor generator.

The gravity power and desalination technology system may further comprise a wind turbine generator disposed in the air intake and configured for generating electricity from a flow of air sucked up by a force of updraft in the inner vent portion.

The wind turbine generator may be a generator with Tesla turbine or traditional turbine.

The external hybrid renewable energy system may comprise a solar panel or surplus electrical energy stored in the external hybrid renewable energy system, and wherein the surplus electrical energy is obtained from an external power grid or the operation of the gravity power and desalination technology system.

Each of the plurality of venting holes may be configured for facilitating the hot-air and vapor to escape from the inner vent portion to the outer vent portion and for deterring the condensate water from entering the inner vent portion.

A density of the venting holes per unit length may increase gradually as going from a lower portion to an upper portion.

The corrugated tube portion may comprise inner corrugations and outer corrugations.

The inner tube portion may have a top end that is closed and a bottom end opened toward the hot-air and vapor generator.

The corrugated tube portion may have an opening at a top end.

The gravity power and desalination technology system may further comprise a terrarium connected to the corrugated tube portion, in which temperature and humidity are controlled by a control valve system for providing hot-air and vapor to the terrarium.

Each of the plurality of venting holes may have an upper portion protruding downwards and outwards and a lower portion protruding upwards and outwards. That is, the venting holes protrude outwards in general and still in the gap between the inner tube portion and the outer tube portion.

The upper portion may protrude further than the lower portion.

The corrugated tube portion may comprise a slanted corrugations, so that sideway wind is guided upwards following a helical line.

The advantages of the present invention are: (1) the gravity power and desalination technology system according to the invention is highly efficient because of tapping energy more than one time; and (2) the gravity power and desalination technology system of the present invention provides means to store energy conveniently and retrieve into more than one type of energy.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 10 is a conceptual cross-sectional view of a gravity power and desalination technology systems grouped together according to an embodiment of the invention;

FIG. 11 is a partially exploded view showing a side view of a corrugated tube portion according to an embodiment of the invention;

FIG. 12 is a front view and a cross-sectional view of a venting hole of a gravity power and desalination technology system according to an embodiment of the invention;

FIG. 13 is a top view showing an artificial hydro power generator according to an embodiment of the invention;

FIG. 15 is a side view showing a tower including inner and outer tube portion, a corrugated tube portion, and venting holes according to an embodiment of the present invention.

DETAILED DESCRIPTION EMBODIMENTS OF THE INVENTION

Figure 1:
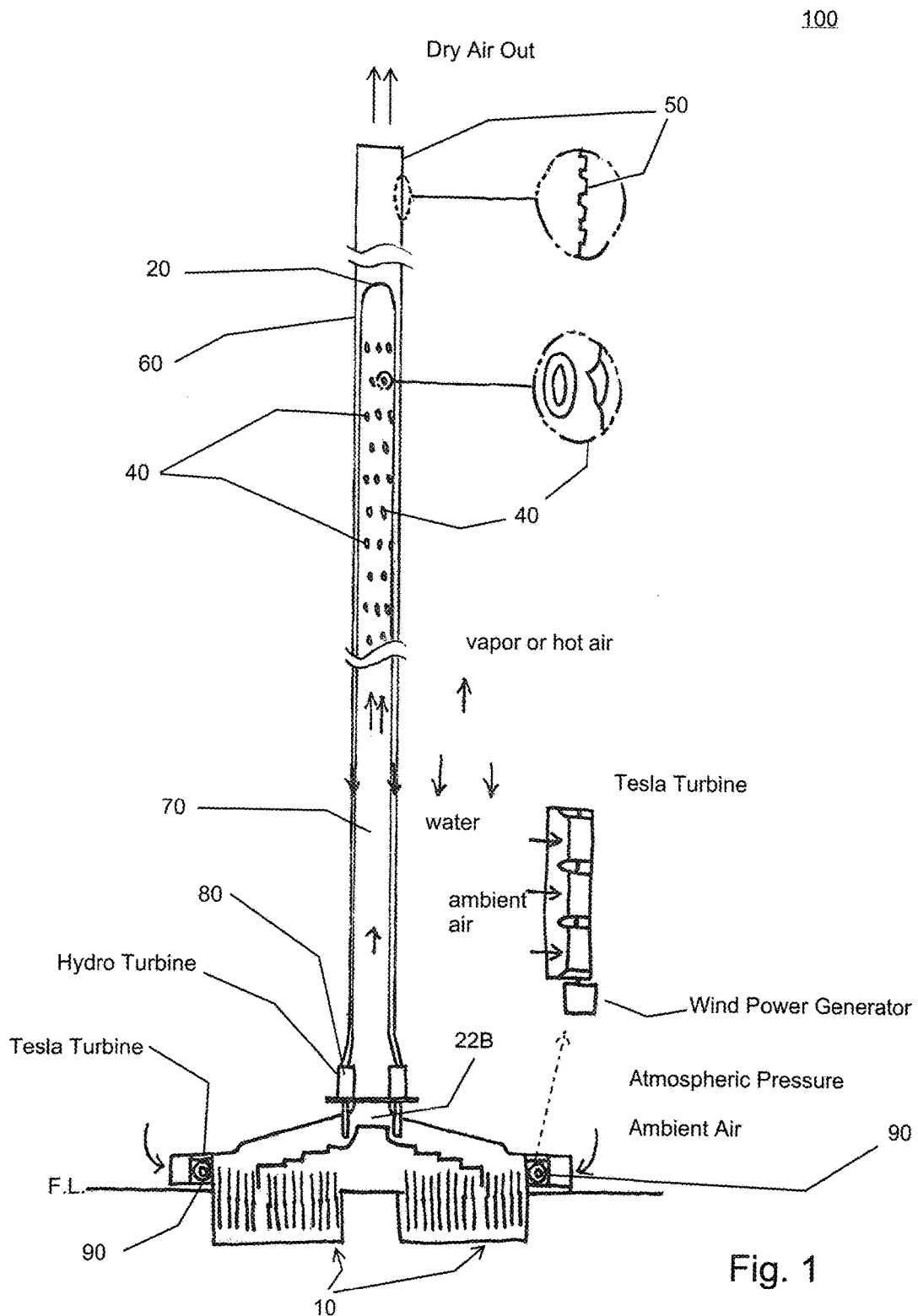
FIG. 1 is a cross-sectional view showing a gravity power and desalination technology system according to an embodiment of the invention.

The U.S. Provisional Patent Application No. 62/208,543 and the U.S. patent application Ser. No. 13/251,734 by the inventor are incorporated by reference into this disclosure as if fully set forth herein.

High temperature heat (over 900° F.) that underwent heat conversion from surplus power in low energy-use times between photovoltaic panel power and self-generated power are heat stored in the underground heat storage and then artificial-geothermalized to be used as energy for activating plant 24/7.

Artificial updraft wind power generating using high pressure vapor that heated fresh water with the underground heat storage and the updraft wind power by the chimney effect of the updraft vent for hot air.

Vapors used for updraft wind power generating rises and due to the natural drop in temperature, it is undergoes condensation into water droplets. Once it reaches high altitudes (600-900 m in the air) it is frozen by the low outside temperature of lateral wind and large quantities of vapor undergo condensation into water to create waterfalls. The powerful waterfalls with added acceleration due to gravity create artificial hydropower. Temperature drops by 0.65° C. every 100 m rise in altitude from the surface Hot water (over approximately 180° F.) discharged by the hydro turbine after hydro power generation is ventilated into the vapor generation tub, and continuously generates through the re-cycling activities of water and vapors that reproduce heated vapors with a small heat quantities to raise temperature by about 40° F.

Technology that includes desalination technology to produce high pressure, high quantity fresh water by using sea water instead of fresh water that has low evaporation temperature and using the same method of #5 and #6 to discharge hydro & updraft wind power generation waterfall.

The concentrate brine additionally made through generation and freshwater production using seawater is brought in and dried as greenhouse clean salt fields to produce salt for table and industrial use.

The GRAVITY POWER & DESALINATION TECHNOLOGY is a hybrid technology project that produces electricity, freshwater and salt simultaneously.

Energy for generating high pressure vapor and hot air for initial plant operation is a clean energy technology for the future generation to prevent global warming by minimizing carbon emissions using photovoltaic generation power by creating a solar farm on the roof or in the vicinity of the plant to use only 100% clean energy instead of petroleum or gases.

The photovoltaic of solar farms are manufactured to be moveable and after normal operation of the plant, they are moved to the next project and reused for activation of the next gravity generation plant.

This is a generation plant that can be built together with structures such as high rises, skyscrapers and steeples, and is an urban eco-friendly generation plant technology that self-produces power needed for the building and that can sell surplus energy to areas around the city.

This is a technology that includes HVAC Systems that can be used for heating and air purification needed for buildings using vapors and high pressure hot water generated from this generation system.

Compared to existing generation and freshwater production technologies, it is a very simple plant facility and it is a green energy generation technology that will clearly have very cheap construction costs and operations costs.

It supplies power to city centers and to the vicinity of the city, and therefore, it is a generation technology with massive economic benefits and carbon emissions reduction by removing infrastructure construction costs such as for electricity pylons and costs for consuming transmission power.

Referring to the figures, the embodiments of the invention are described in detail.

FIGS. 1 to 15 show a gravity power and desalination technology system 100 according to embodiments of the present invention.

An aspect of the invention provides a gravity power and desalination technology system 100, comprising a heat storage apparatus 10, an inner tube portion 20, a hot-air and vapor generator 30, and a plurality of venting holes 40, a corrugated tube portion 50, an outer tube portion 60, an updraft wind power generator 70, and an artificial hydro power generator 80 as shown in FIG. 1.

The heat storage apparatus 10 is provided in a lower portion of the gravity power and desalination technology system 100 and configured for storing heat received from an external hybrid renewable energy system. The heat storage apparatus has been described in detail in the U.S. patent application Ser. No. 13/251,734 by the inventor and incorporated by reference into this application.

Figure 14:
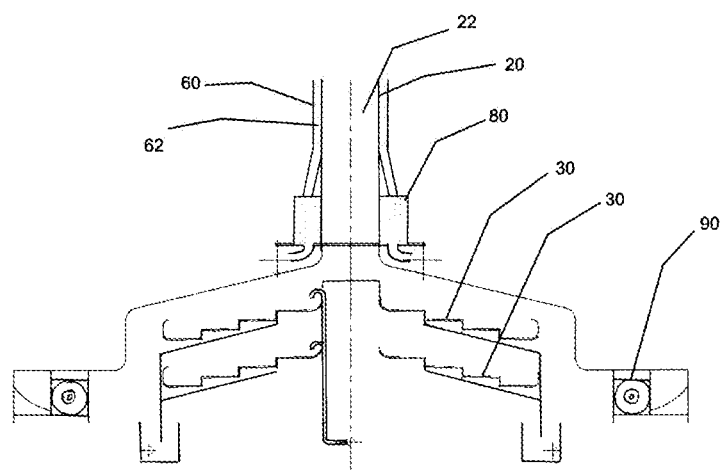
FIG. 14 is another cross-sectional view showing a plurality of condensate water collectors of a gravity power and desalination technology system according to the invention.

The inner tube portion 20 has an inner vent portion 22 inside and disposed vertically over the heat storage apparatus 10 as shown in FIG. 14.

The hot-air and vapor generator 30 is disposed between the heat storage apparatus 10 and the inner tube portion 20 and configured for using the heat stored in the heat storage apparatus 10 and generating hot-air and vapor, and providing the generated hot-air and vapor to the inner vent portion 22.

The outer tube portion 60 encloses the inner tube portion 20 and forming an outer vent portion 62 in between the inner tube portion 20 and the outer tube portion 60 as shown in FIG. 14.

The plurality of venting holes 40 are bored through the inner tube portion 20 obliquely outwards.

The corrugated tube portion 50 is provided on a top portion of the outer tube portion 60.

The updraft wind power generator 70 is installed in a lower portion of the inner vent portion 22.

The artificial hydro power generator 80 is installed in a lower portion of the outer vent portion 60.

The heat storage apparatus 10 may be provided under the ground and has a circular shape with the inner tube portion 20 and the outer tube portion 60 disposed at a center of the circular shape as shown in FIGS. 3-6.

Figure 9:
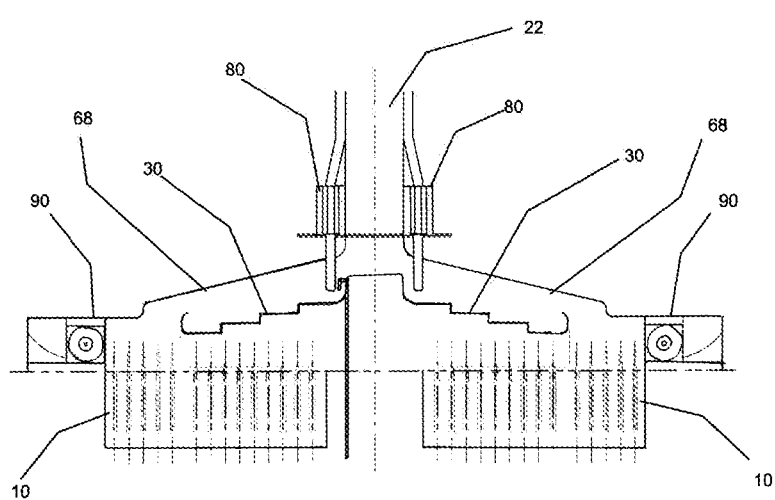
FIG. 9 is a cross-sectional view showing a updraft wind power generator and an artificial hydro power generator of a gravity power and desalination technology systems grouped together according to an embodiment of the invention.

The gravity power and desalination technology system 100 may further comprise a collection funnel portion 36 provided between the hot-air and vapor generator 30 and the inner and outer tube portions 20, 60 and configured for collecting and guiding the generated hot-air and vapor to the inner vent portion 22 as shown in FIG. 9.

Figure 3:
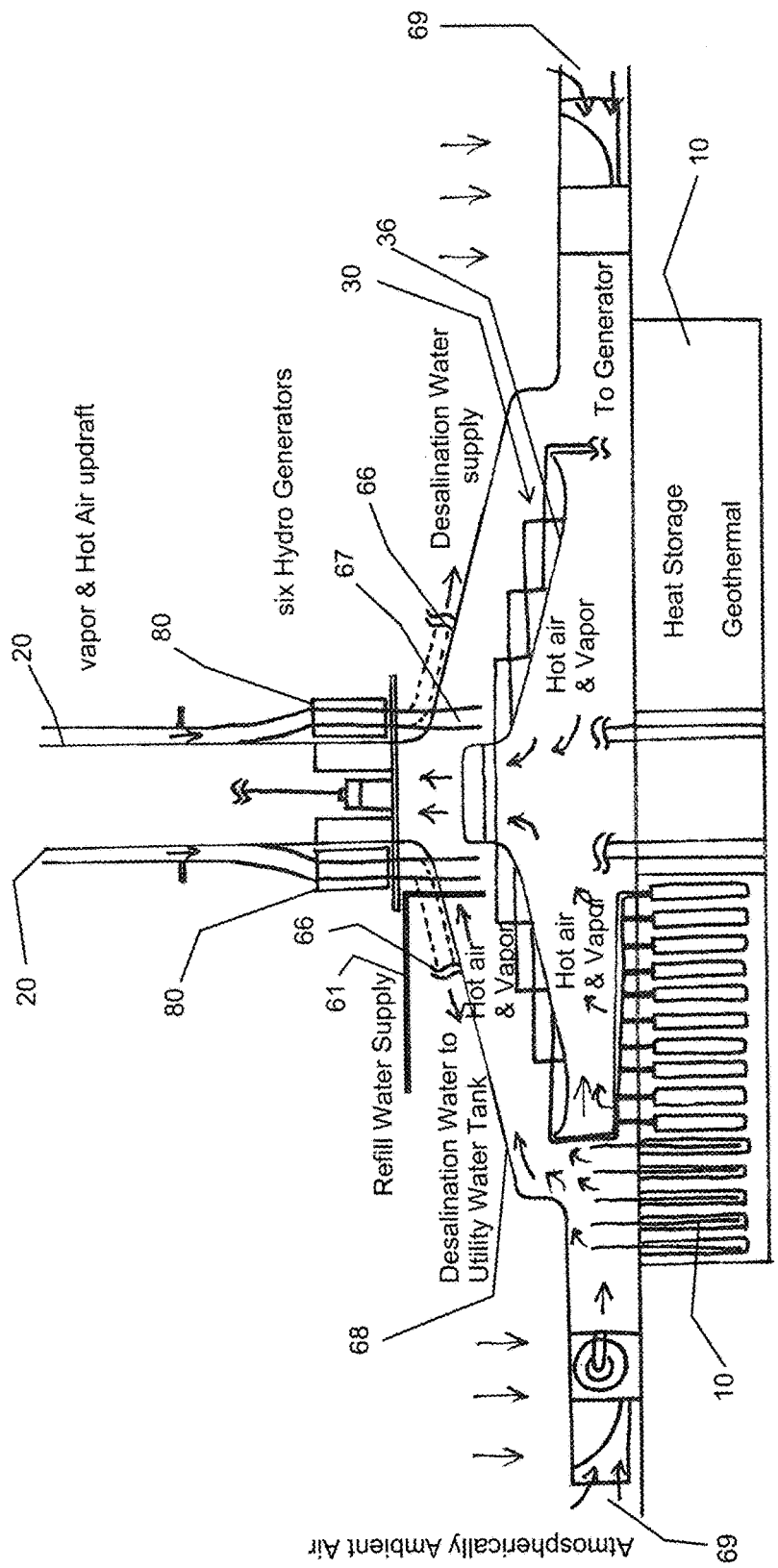
FIG. 3 is a vertical cross-sectional view showing a lower portion of a gravity power and desalination technology system according to an embodiment of the invention.
Figure 4:
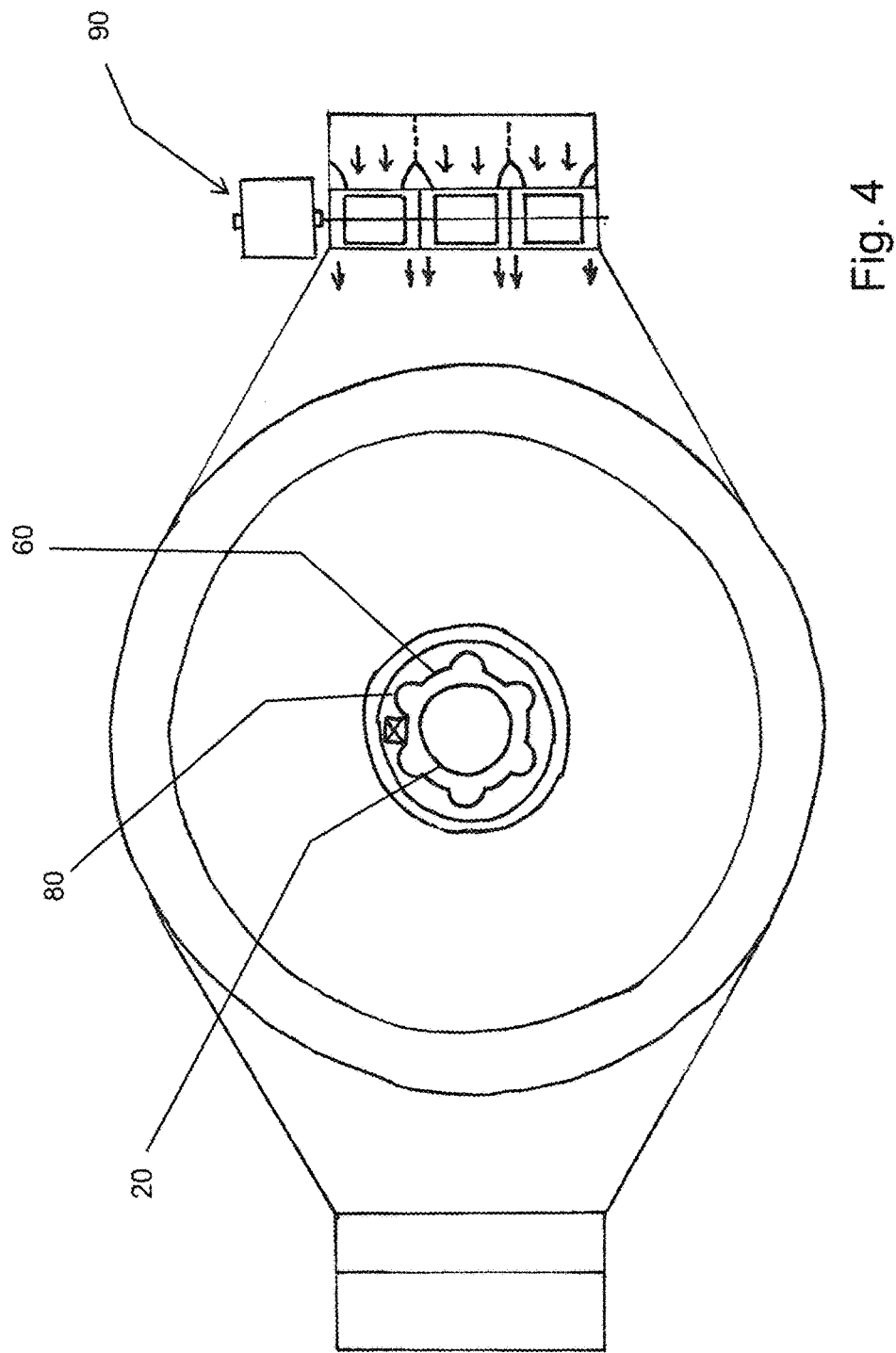
FIG. 4 is a horizontal projection view showing a lower portion of a gravity power and desalination technology system according to an embodiment of the invention.
Figure 5:
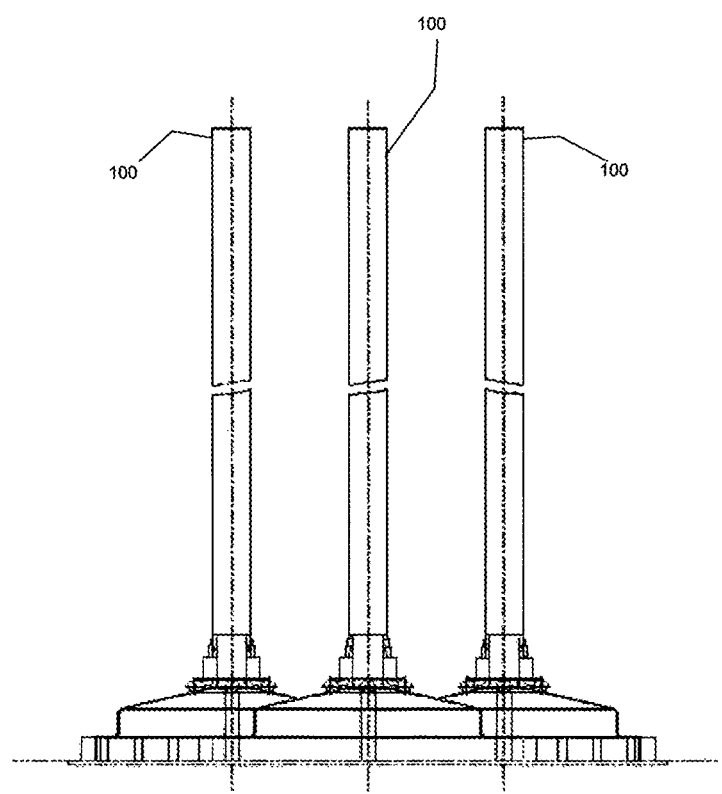
FIG. 5 is a perspective view showing three gravity power and desalination technology systems grouped together according to an embodiment of the invention.
Figure 6:
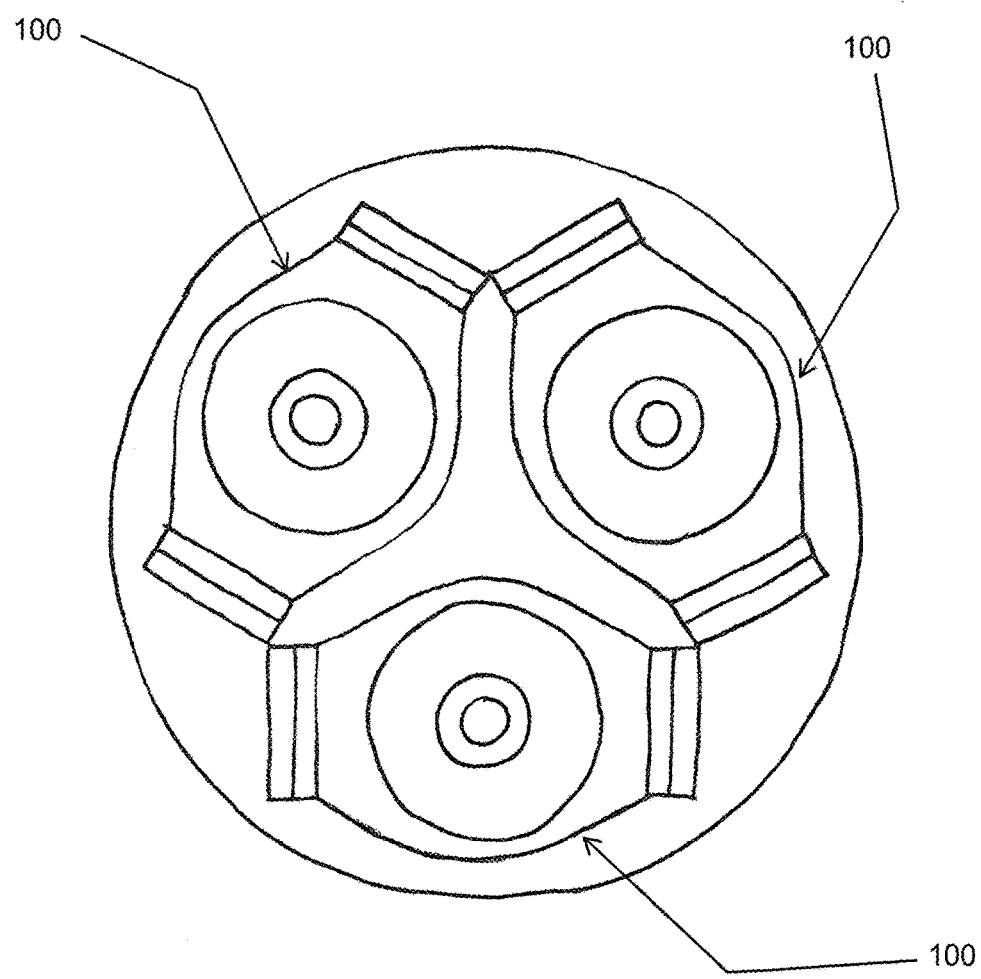
FIG. 6 is a top plan view showing the three gravity power and desalination technology systems of FIG. 5.
Figure 7:
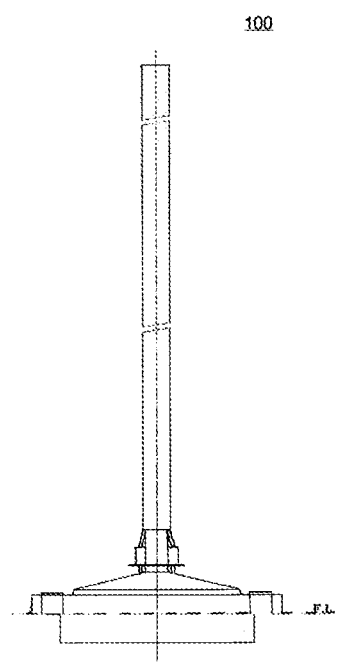
FIG. 7 is a side view showing a single gravity power and desalination technology systems grouped together according to an embodiment of the invention.
Figure 8:
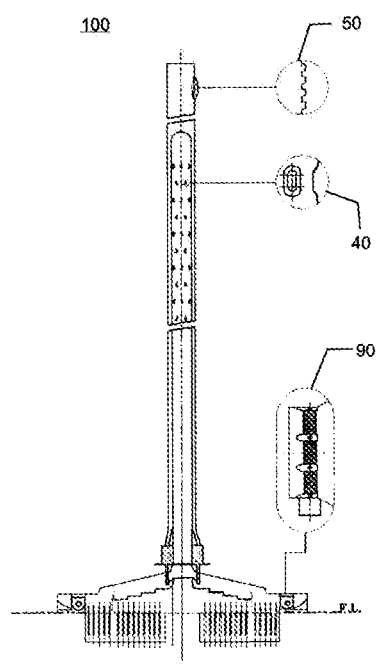
FIG. 8 is a partial cross-sectional view showing a gravity power and desalination technology systems grouped together according to an embodiment of the invention.

The gravity power and desalination technology system 100 may further comprise a plurality of condensate water collectors 67 disposed on an upper surface of the funnel portion 36 and configured for collecting and guiding condensate water from the artificial hydro power generator 80 to the hot-air and vapor generator 30 as shown in FIG. 3.

Each of the plurality of condensate water collectors 67 comprises a plurality of step portions 32 cascading from a central portion of the upper surface of the funnel portion 36 down to a perimeter portion of the funnel portion 36, and each of the plurality of step portions 32 is heated by solar energy coming through a canopy portion 68 provided over the funnel portion 36 as shown in FIG. 3.

The gravity power and desalination technology system 100 may further comprise a sea water supplier (not shown) and a desalination water collector 66 as shown in FIG. 3.

The sea water supplier may be connected to the hot-air and vapor generator 30 through a separate pipe 61 for providing sea water to the hot-air and vapor generator 30.

The desalination water collector 66 is connected to the plurality of condensate water collectors 67 and configured for extracting the desalination water to outside as shown in FIG. 3.

The gravity power and desalination technology system 100 may further comprise a brine water extractor (not shown) connected to the hot-air and vapor generator 30 for collecting and extracting brine water to outside.

The gravity power and desalination technology system 100 may further comprise a water intake 61 connected to the hot-air and vapor generator 30 and an air intake 69 connected to the hot-air and vapor generator 30.

The gravity power and desalination technology system 100 may further comprise a wind turbine generator 90 disposed in the air intake 69 and configured for generating electricity from a flow of air sucked up by a force of updraft in the inner vent portion 22.

The wind turbine generator 90 may be a generator with Tesla turbine or surplus electrical energy stored in the external hybrid renewable energy system, and the surplus electrical energy is obtained from an external power grid network or the operation of the gravity power and desalination technology system.

The external hybrid renewable energy system may comprise a solar panel.

Each of the plurality of venting holes 40 may be configured for facilitating the hot-air and vapor to escape from the inner vent portion 22 to the outer vent portion 62 and for deterring the condensate water from entering the inner vent portion 22.

A density of the venting holes 40 per unit length may increase gradually as going from a lower portion to an upper portion.

Figure 2:
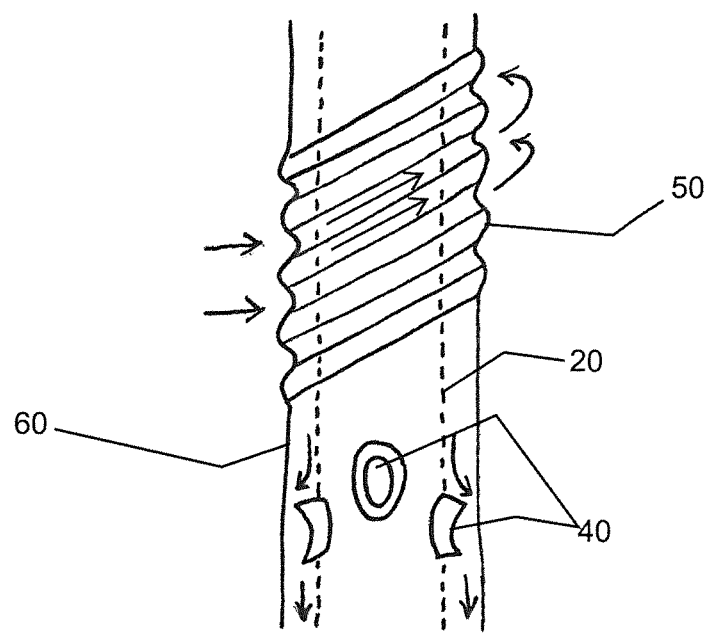
FIG. 2 is a side view showing a corrugated tube portion and venting holes of a gravity power and desalination technology system according to an embodiment of the invention.

The corrugated tube portion 50 may comprise inner corrugations (not shown) and outer corrugations 52. Event though not shown explicitly, the shape of the inner corrugations can be provided correspondingly to the outer corrugations 52 as shown in FIG. 2.

The inner tube portion 22 may have a top end 22T that is closed and a bottom end 22B opened toward the hot-air and vapor generator 30 as shown in FIG. 1.

The corrugated tube portion 50 may have an opening at a top end as shown in FIG. 1.

The gravity power and desalination technology system 100 may further comprise a terrarium (not shown) connected to the corrugated tube portion 50 especially as shown in FIG. 1, in which temperature and humidity are controlled by a control valve system (not shown) for providing hot-air and vapor to the terrarium. Even though the terrarium and the control valve system are well known in the community, a serious innovation can be achieved when combined with the gravity power and desalination technology system 100 according to the invention.

Each of the plurality of venting holes 40 may have an upper portion protruding downwards and outwards and a lower portion protruding upwards and outwards as shown in FIG. 1. That is, the venting holes 40 protrude outwards in general and still in the gap between the inner tube portion 20 and the outer tube portion 60.

The upper portion may protrude further than the lower portion.

The corrugated tube portion 50 may comprise a slanted corrugations 52, so that sideway wind is guided upwards following a helical line as shown in FIG. 2.

With the above inventive structures of the invention, air of low temperature on the ground is introduced into the hot-air and vapor generator 30 as shown in FIG. 3, due to the atmospheric pressure, heated up by the stored heat of middle temperature in the heat storage apparatus 10 and expands and rises up through the chimney effect of the updraft vent. The high pressure vapor generated by the hot-air and vapor generator 30 rises up along with the rising air, generating an artificial soar wind power for operating the wind turbine (Tesla or traditional).

The air temperature drops by 0.65 degrees in Celsius for an elevation of every 100 meters, and the sideway wind of low temperature blowing at an altitude of 1000 meters can be used as a cooling medium. Also, the vapor rising in the high-rising vent portion rises and generates a sort of tornado due to the Coriolis Effect by the rotation of Earth. The high-rising vent portion may be designed so as to have a helical shape, facilitating the tornado rising of the hot vapor or air and heat exchange, resulting in the increase of condensation.

Also, the rising vapor turns into water due to the naturally falling temperature, letting out latent heat of 650 Kcal per 1 Kg, which is transferred to the rising air for wind power generating, reheating the rising air, the temperature of which was falling down due to rising, so as to make the rising wind power kept strong.

A humidity sensor may be installed at a topmost end of the high vent for preventing to lose vapor and at the same time for automatic controlling the amount of generated high-pressure vapor, facilitating an optimal amount of water for power generation and preventing unnecessary energy loss, so as to help to solve the problem of global warming.

Since the pressure of air mass rising and swirling in high speed falls down, the rising force is intensified and the power generation gets facilitated as in the tornado.

In addition, the gravity power and desalination technology system can be built along an ocean beach, and the sea water is taken into the system and electrical energy and fresh water can be obtained at the same time. Especially, since the fresh water obtained as in the above is above 70 degrees in Celsius, it can be used to pre-heat the sea water introduced into the system, and the fresh water of 40~45 degrees after heating the sea water can be used for the home water system.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A gravity power and desalination technology system comprising:

a heat storage apparatus provided in a lower portion of the gravity power and desalination technology system and configured for storing heat received from an external hybrid renewable energy system;

an inner tube portion having an inner vent portion inside and disposed vertically over the heat storage apparatus;

a hot-air and vapor generator disposed between the heat storage apparatus and the inner tube portion and configured for using the heat stored in the heat storage apparatus and generating hot-air and vapor, and providing the generated hot-air and vapor to the inner vent portion;

an outer tube portion enclosing the inner tube portion and forming an outer vent portion in between the inner tube portion and the outer tube portion;

a plurality of venting holes bored through the inner tube portion obliquely outwards;

a corrugated tube portion provided on a top portion of the outer tube portion;

an updraft wind power generator installed in a lower portion of the inner vent portion; and a hydro power generator installed in a lower portion of the outer vent portion, wherein the heat storage apparatus is provided under the ground and has a circular shape with the inner tube portion and the outer tube portion disposed at a center of the circular shape, further comprising a collection funnel portion provided between the hot-air and vapor generator and the inner and outer tube portions and configured for collecting and guiding the generated hot-air and vapor to the inner vent portion, and further comprising a plurality of condensate water collectors disposed on an upper surface of the funnel portion and configured for collecting and guiding condensate water from the hydro power generator to the hot-air and vapor generator, wherein each of the plurality of condensate water collectors comprises a plurality of step portions cascading from a central portion of the upper surface of the funnel portion down to a perimeter portion of the funnel portion, and wherein each of the plurality of step portions is heated by solar energy coming through a canopy portion provided over the funnel portion.

2. The gravity power and desalination technology system of claim 1, further comprising:

a sea water supplier connected to the hot-air and vapor generator for providing sea water to the hot-air and vapor generator; and a desalination water collector connected to the plurality of condensate water collectors and configured for extracting the desalination water.

3. The gravity power and desalination technology system of claim 2, further comprising a brine water extractor connected to the hot-air and vapor generator for collecting and extracting brine water to outside.

4. The gravity power and desalination technology system of claim 1, further comprising:

a water intake connected to the hot-air and vapor generator; and an air intake connected to the hot-air and vapor generator.

5. The gravity power and desalination technology system of claim 4, further comprising a wind turbine generator disposed in the air intake and configured for generating electricity from a flow of air sucked up by a force of updraft in the inner vent portion.

6. The gravity power and desalination technology system of claim 5, wherein the wind turbine generator is a generator with a Tesla turbine or a traditional turbine.

7. The gravity power and desalination technology system of claim 1, wherein the external hybrid renewable energy system comprises a solar panel or surplus electrical energy stored in the external hybrid renewable energy system, and wherein the surplus electrical energy is obtained from an external power grid or the operation of the gravity power and desalination technology system.

8. The gravity power and desalination technology system of claim 1, wherein each of the plurality of venting holes is configured for facilitating the hot-air and vapor to escape from the inner vent portion to the outer vent portion and for deterring the condensate water from entering the inner vent portion.

9. The gravity power and desalination technology system of claim 1, wherein the corrugated tube portion comprises inner corrugations and outer corrugations.

10. The gravity power and desalination technology system of claim 1, wherein the corrugated tube portion has an opening at a top end.

11. The gravity power and desalination technology system of claim 1, wherein the corrugated tube portion comprises slanted corrugations, so that sideway wind is guided upwards following a helical line.

12. A gravity power and desalination technology system comprising:
    a heat storage apparatus provided in a lower portion of the gravity power and desalination technology system and configured for storing heat received from an external hybrid renewable energy system;
    an inner tube portion having an inner vent portion inside and disposed vertically over the heat storage apparatus;
    a hot-air and vapor generator disposed between the heat storage apparatus and the inner tube portion and configured for using the heat stored in the heat storage apparatus and generating hot-air and vapor, and providing the generated hot-air and vapor to the inner vent portion;
    an outer tube portion enclosing the inner tube portion and forming an outer vent portion in between the inner tube portion and the outer tube portion;
    a plurality of venting holes bored through the inner tube portion obliquely outwards;
    a corrugated tube portion provided on a top portion of the outer tube portion;
    an updraft wind power generator installed in a lower portion of the inner vent portion; and
    a hydro power generator installed in a lower portion of the outer vent portion,
    wherein a density of the venting holes per unit length increases gradually as going from a lower portion of the inner tube portion to an upper portion of the inner tube portion.

13. A gravity power and desalination technology system comprising:
    a heat storage apparatus provided in a lower portion of the gravity power and desalination technology system and configured for storing heat received from an external hybrid renewable energy system;
    an inner tube portion having an inner vent portion inside and disposed vertically over the heat storage apparatus;
    a hot-air and vapor generator disposed between the heat storage apparatus and the inner tube portion and configured for using the heat stored in the heat storage apparatus and generating hot-air and vapor, and providing the generated hot-air and vapor to the inner vent portion;
    an outer tube portion enclosing the inner tube portion and forming an outer vent portion in between the inner tube portion and the outer tube portion;
    a plurality of venting holes bored through the inner tube portion obliquely outwards;
    a corrugated tube portion provided on a top portion of the outer tube portion;
    an updraft wind power generator installed in a lower portion of the inner vent portion; and
    a hydro power generator installed in a lower portion of the outer vent portion,
    wherein the inner tube portion has a top end that is closed and a bottom end opened toward the hot-air and vapor generator.

14. A gravity power and desalination technology system comprising:
    a heat storage apparatus provided in a lower portion of the gravity power and desalination technology system and configured for storing heat received from an external hybrid renewable energy system;
    an inner tube portion having an inner vent portion inside and disposed vertically over the heat storage apparatus;
    a hot-air and vapor generator disposed between the heat storage apparatus and the inner tube portion and configured for using the heat stored in the heat storage apparatus and generating hot-air and vapor, and providing the generated hot-air and vapor to the inner vent portion;
    an outer tube portion enclosing the inner tube portion and forming an outer vent portion in between the inner tube portion and the outer tube portion;
    a plurality of venting holes bored through the inner tube portion obliquely outwards;
    a corrugated tube portion provided on a top portion of the outer tube portion;
    an updraft wind power generator installed in a lower portion of the inner vent portion; and
    a hydro power generator installed in a lower portion of the outer vent portion,
    further comprising a terrarium connected to the corrugated tube portion, in which temperature and humidity are controlled by a control valve system for providing hot-air and vapor to the terrarium.

15. A gravity power and desalination technology system comprising:
    a heat storage apparatus provided in a lower portion of the gravity power and desalination technology system and configured for storing heat received from an external hybrid renewable energy system;
    an inner tube portion having an inner vent portion inside and disposed vertically over the heat storage apparatus;
    a hot-air and vapor generator disposed between the heat storage apparatus and the inner tube portion and configured for using the heat stored in the heat storage apparatus and generating hot-air and vapor, and providing the generated hot-air and vapor to the inner vent portion;
    an outer tube portion enclosing the inner tube portion and forming an outer vent portion in between the inner tube portion and the outer tube portion;
    a plurality of venting holes bored through the inner tube portion obliquely outwards;
    a corrugated tube portion provided on a top portion of the outer tube portion;

an updraft wind power generator installed in a lower portion of the inner vent portion; and a hydro power generator installed in a lower portion of the outer vent portion, wherein each of the plurality of venting holes has an upper portion protruding downwards and outwards and a lower portion protruding upwards and outwards.

16. The gravity power and desalination technology system of claim 15, wherein the upper portion of the plurality of venting holes protrudes further than the lower portion of the plurality of venting holes.

* * * * *